US012295283B2

(12) United States Patent
Ogura

(10) Patent No.: US 12,295,283 B2
(45) Date of Patent: May 13, 2025

(54) ELECTRIC WORK VEHICLE

(71) Applicant: Kanzaki Kokyukoki Mfg. Co., Ltd., Hyogo (JP)

(72) Inventor: Kohei Ogura, Hyogo (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 278 days.

(21) Appl. No.: 17/970,249

(22) Filed: Oct. 20, 2022

(65) Prior Publication Data

US 2023/0125993 A1  Apr. 27, 2023

(30) Foreign Application Priority Data

Oct. 22, 2021 (JP) .................................. 2021-173101

(51) Int. Cl.
  *A01D 34/00* (2006.01)
  *A01D 34/78* (2006.01)
  *A01D 34/82* (2006.01)
  *A01D 34/66* (2006.01)

(52) U.S. Cl.
  CPC ........... *A01D 34/006* (2013.01); *A01D 34/78* (2013.01); *A01D 34/828* (2013.01); *A01D 34/66* (2013.01)

(58) Field of Classification Search
  CPC ...... A01D 34/006; A01D 34/66; A01D 34/78; A01D 34/828
  See application file for complete search history.

(56) References Cited

U.S. PATENT DOCUMENTS

| 2008/0035399 | A1  | 2/2008 | Murata et al. |
| 2008/0061645 | A1  | 3/2008 | Yukitake |
| 2012/0227368 | A1  | 9/2012 | Koike et al. |
| 2013/0168174 | A1  | 7/2013 | Takagi |
| 2016/0020714 | A1* | 1/2016 | Wang ..................... A01D 34/78 318/139 |

FOREIGN PATENT DOCUMENTS

| JP | S5044919 U | 5/1975 |
| JP | 2008048494 A | 2/2008 |

(Continued)

OTHER PUBLICATIONS

JPO Notice of Reasons of Refusal for corresponding JP Application No. 2019-012312; Mailing Date Aug. 30, 2022.

(Continued)

*Primary Examiner* — Dale Moyer
(74) *Attorney, Agent, or Firm* — CANTOR COLBURN LLP

(57) ABSTRACT

An electric work vehicle includes a traveling motor to drive wheels, a working motor to drive a work machine, a manipulator to direct a target rotation speed of the traveling motor and operation of the work machine, a controller to control the traveling motor and the working motor according to operation of the manipulator, and a temperature sensor to detect temperature of the working motor. The controller maintains or changes a target torque range of the working motor according to a detected temperature of the working motor, and the controller maintains or changes a target rotation speed of the traveling motor so that a calculated output torque value of the working motor falls within the target torque range.

5 Claims, 8 Drawing Sheets

(56) References Cited

FOREIGN PATENT DOCUMENTS

| | | | |
|---|---|---|---|
| JP | 2008067571 | A | 3/2008 |
| JP | 2008213775 | A | 9/2008 |
| JP | 2012044760 | A | 3/2012 |
| JP | 2012187026 | A | 10/2012 |
| JP | 2016111723 | A | 6/2016 |
| JP | 6121213 | B2 | 4/2017 |
| JP | 201820770 | A | 12/2018 |

OTHER PUBLICATIONS

JPO Notice Reasons for Refusal for corresponding JP Application No. 2019-012305; Mailing Date, Oct. 4, 2022.

* cited by examiner

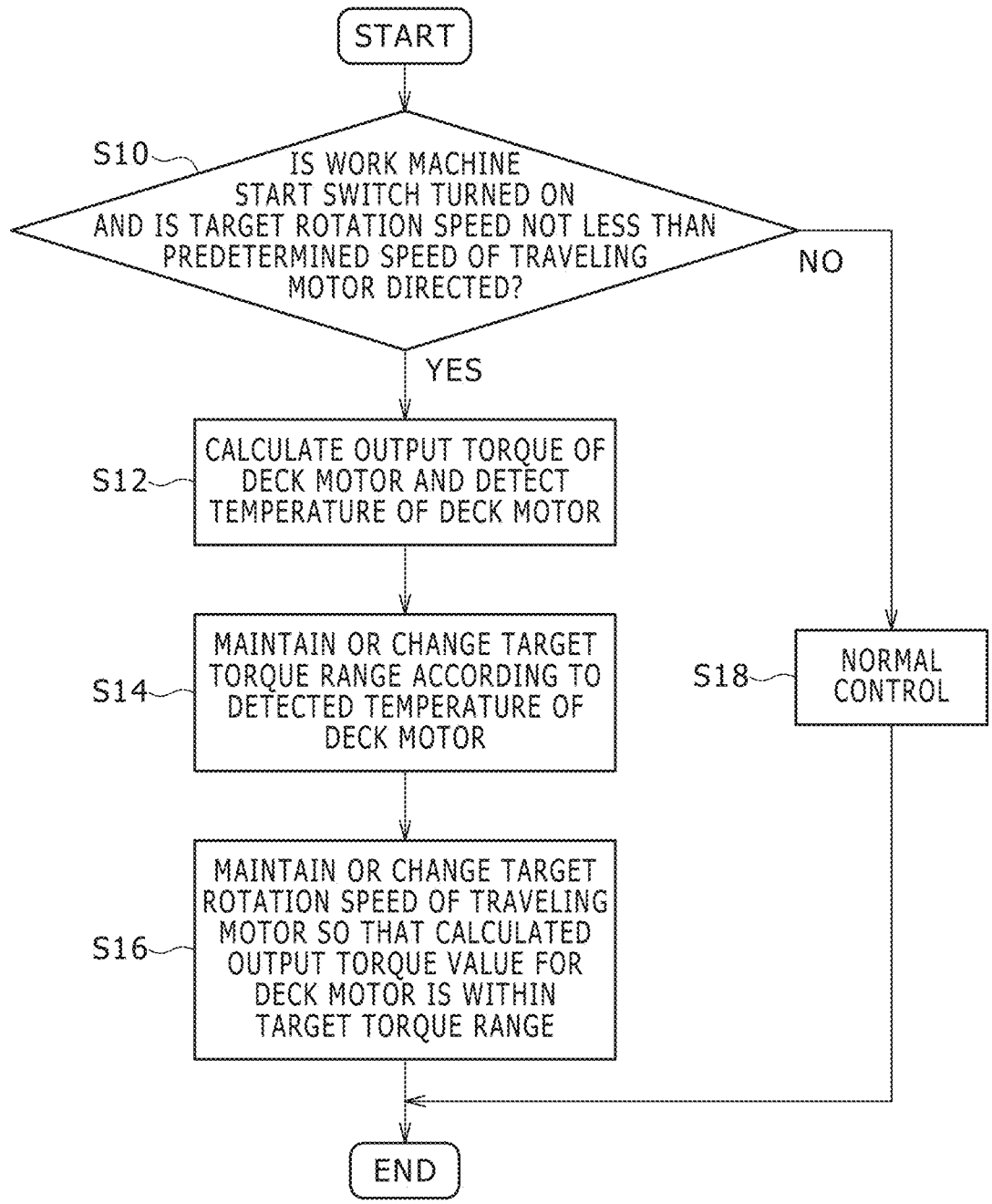
F I G . 5

ELECTRIC WORK VEHICLE

CROSS REFERENCES TO RELATED APPLICATIONS

The present invention claims priority under 35 U.S.C. § 119 to Japanese Application, 2021-173101, filed on Oct. 22, 2021, the entire contents of which being incorporated herein by reference.

BACKGROUND

Technical Field

The present disclosure relates to an electric work vehicle including a traveling motor to drive wheels and a working motor to drive a work machine.

Related Art

Conventionally, a work vehicle equipped with a work machine is known. For example, a lawn mowing vehicle equipped with a mowing device as a work machine, which is driven to perform a lawn mowing operation, is conventionally known. In such a work vehicle, an electric work vehicle equipped with a traveling motor being an electric motor to drive wheels, and a working motor to drive the work machine has been also considered.

For example, Japanese Patent No. 6121213 and Japanese Patent Laid-open Publication No. 2012-187026 describe an electric work vehicle in which each of traveling motors of left and right electric motors drives a wheel on the corresponding side, and a blade motor (working motor) drives a rotating blade of a lawn mowing unit (work machine).

In the vehicle described in Japanese Patent No. 6121213, the temperature of the blade motor is detected by a temperature sensor, and when the temperature detected by the temperature sensor is higher than a threshold value, an exceptional speed control unit drives the traveling motor so that the vehicle travels at an exceptional speed lower than a target traveling speed determined by left and right operation levers. It is expected that this allows the blade motor to be protected.

On the other hand, in the vehicle described in Japanese Patent Laid-open Publication 2012-187026, a controller has a load evaluation unit to calculate a load evaluation value indicating the load applied to the blade motor, and when the load evaluated by the load evaluation unit is higher than a threshold value, the exceptional speed control unit drives the traveling motor so that the vehicle travels at an exceptional speed lower than the target traveling speed determined by the left and right operation levers.

In the configuration described in Japanese Patent No. 6121213, since the vehicle is driven to travel at the exceptional speed when the detected temperature of the working motor is high, there is concerned that the vehicle speed is excessively reduced regardless of the condition of a ground to be worked by the work machine, such as no or little lawn. Therefore, there is a need to achieve both a protection of the working motor and an improvement of work efficiency by allowing a longer travel time at a higher vehicle speed. On the other hand, in the configuration described in Japanese Patent Laid-open Publication No. 2012-187026, there is concern that although the lawn condition may be reflected in the control of the traveling to some extent, the vehicle speed may be reduced more significantly than necessary when the temperature of the working motor is sufficiently low against the allowable temperature, even if the load of the working motor is high. In this case, there is also a need to achieve both protection of the working motor and an improvement of work efficiency by allowing a longer travel time at a higher vehicle speed.

SUMMARY

An object of the present disclosure is to achieve both protection of the working motor and an increase of work efficiency in the electric work vehicle.

An electric work vehicle according to the present disclosure is such an electric work vehicle that includes a traveling motor to drive wheels, a working motor to drive a work machine, a manipulator to direct a target rotation speed of the traveling motor and operation of the work machine, a controller to control the traveling motor and the working motor according to operation of the manipulator, and a temperature sensor to detect temperature of the working motor, wherein the controller maintains or changes a target torque range of the working motor according to a detected temperature of the working motor, and the controller maintains or changes a target rotation speed of the traveling motor so that a calculated output torque value of the working motor falls within the target torque range.

BRIEF DESCRIPTION OF THE DRAWINGS

FIG. 5 is a flowchart showing a method of controlling a target rotation speed of a traveling motor in the embodiment;

DESCRIPTION OF EXEMPLARY EMBODIMENTS

Description of Embodiments

Figure 1:
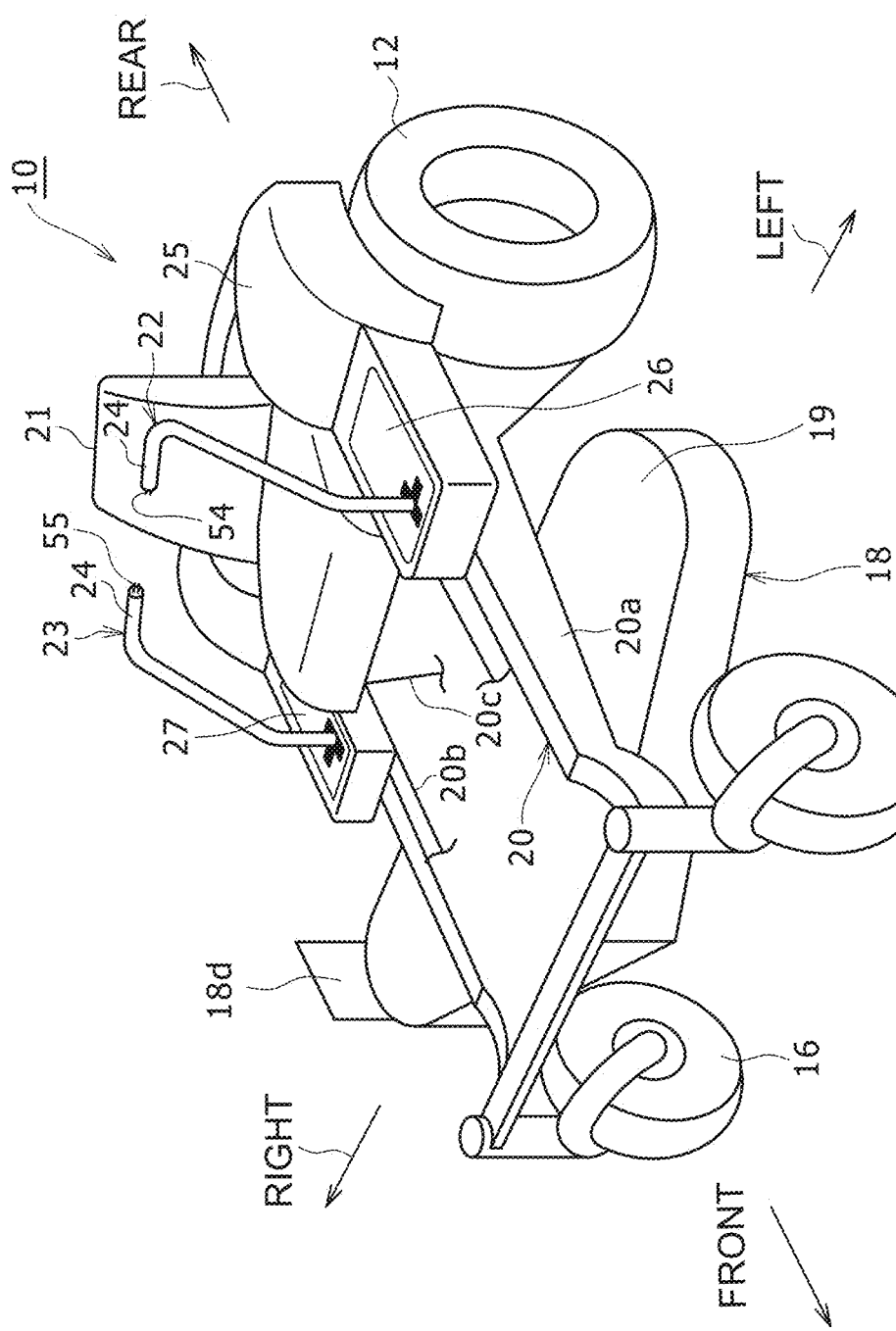
FIG. 1 is a perspective view of an electric work vehicle according to an embodiment of the present disclosure.

Now, some embodiments of the present disclosure will be described below in detail with reference to the drawings. The following describes the case where an electric work vehicle is a lawn mowing vehicle, but the electric work vehicle is not limited thereto and may be any other work vehicle with a work machine which can perform any one or more of tasks such as snow removal, excavation, civil engineering, and agricultural work. Also the following describes the case where a left-right lever-type operator with left and right operation levers is used as only an example, but a steering handle may be used as a steering controller (turning manipulator), and an accelerator pedal provided in front of a seat may be used as an acceleration controller (acceleration manipulator). The below-described shapes, number of units, arrangement of components, etc. are only examples for the purposes of illustration, and may be modified so as to meet the specification of the electric work vehicle where appropriate. In the following description, the same components are denoted by identical reference numerals throughout the entire drawings and redundant explanations will be omitted or simplified.

Figure 2:
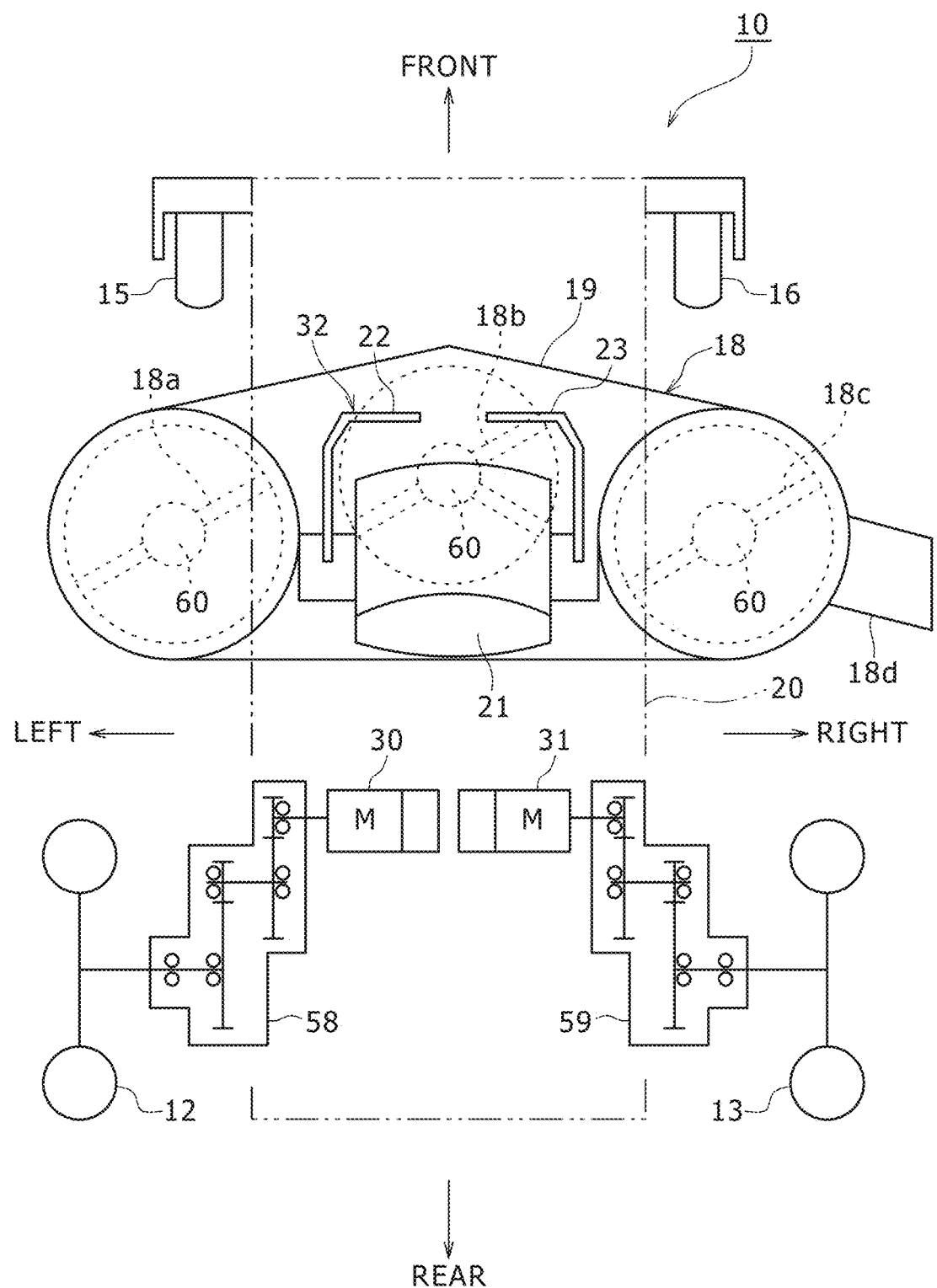
FIG. 2 is a schematic configuration diagram of the vehicle shown in FIG. 1.

With reference to FIGS. 1 to 6, an embodiment of an electric work vehicle 10 is described. In the following, the electric work vehicle 10 will be referred to as the vehicle 10. FIG. 1 is a perspective view of the vehicle 10. FIG. 2 is a schematic configuration diagram of the vehicle 10. The configurations shown in FIGS. 1 to 6 describe the case where left and right wheels 12, 13 are located on the rear side and caster wheels 15, 16 are located on the front side, but the left and right wheels and the caster wheels may be located on the front side and the rear side, respectively.

The vehicle 10 is a self-propelled lawn mowing vehicle suitable for mowing lawns. The vehicle 10 includes the left wheel 12 and the right wheel 13 (see FIG. 2) being the left and right wheels, the caster wheels 15, 16, a mowing device 18 being a work machine, a left traveling motor 30 and a right traveling motor 31 (see FIG. 2), two left and right operation levers 22, 23 and a work machine start switch 33 which constitute a manipulator 32 (see FIG. 3), two left and right traveling inverters 84, 86, three deck inverters 88, and a control device 40 which constitute a controller 100 (see FIG. 3), and three motor temperature sensors 34 (see FIG. 3). Each of the left traveling motor 30 and the right traveling motor 31 is an electric motor.

The left wheel 12 and the right wheel 13, which are supported on the left and right sides of the rear side of a main frame 20 which is a vehicle body, are the rear wheels as well as main driving wheels. The main frame 20, which is made of a metal such as steel, is formed in a beam structure and the like. The main frame 20 has side plates 20a and 20b extending in a substantially front-rear direction at the left and right ends, and a connection part 20c connecting the left and right side plates 20a, 20b. A driver's seat 21 is fixed on the connection part 20c and between the rear ends of the left and right side plates 20a, 20b.

In the main frame 20, two guide panels 26, 27 are fixed on the left and right sides of the driver's seat 21, and two left and right operation levers 22, 23 are supported on the main frame 20 so that they protrude upward from the two guide panels 26, 27, respectively. The left operation lever 22 corresponds to an acceleration instructor to direct acceleration of the left traveling motor 30, and the right operation lever 23 corresponds to an acceleration instructor to direct acceleration of the right traveling motor 31. A driver grasps tips of the operation levers 22, 23 to direct a direction and a speed of rotation of each of the left wheel 12 and the right wheel 13. The left operation lever 22 is operated to direct the drive and the acceleration of the left wheel 12 by changing the indication of the rotation speed of the left wheel 12 so that the rotation speed thereof becomes higher. The right operation lever 23 is operated to direct the drive and the acceleration of the right wheel 13 by changing the indication of the rotation speed of the right wheel 13 so that the rotation speed thereof becomes higher. Each of the operation levers 22, 23 is formed almost in an L-shape and has a grip 24 at the upper end thereof, which extends in the left-right direction. The driver grasps the grip 24 to operate the vehicle. Each of the operation levers 22, 23 can swing at the lower end thereof about an axis along the left-right direction.

When each of the operation levers 22, 23 is tilted to the front side with respect to an N position which is a neutral position near an upright position, it directs that the motor 30 (or 31) on the same side as the operation lever 22 (or 23) be driven at the target number of rotations per unit time ($\sec^{-1}$) which corresponds to a target rotation speed, resulting in a forward movement of the vehicle. Each of the operation levers 22, 23 directs that the larger the amount of a tilt thereof, the higher the target number of rotations. When each of the operation levers 22, 23 is tilted to the rear side with respect to the N position, it directs that the motor 30 (or 31) on the same side as the operation lever 22 (or 23) to be driven at a target number of rotations resulting in a backward movement of the vehicle as well as directing that the larger the amount of a tilt thereof, the higher the target number of rotations. This causes the operation levers 22, 23 to direct target number of rotations to the corresponding traveling motors 30, 31, respectively.

The swing positions of the two left and right operation levers 22, 23 in the front-rear direction are detected by a left lever sensor 50 and a right lever sensor 51 (see FIG. 3), each of which is a lever position sensor. Each of the lever sensors 50, 51 includes a potentiometer, for example. A detection signal detected by each of the lever sensors 50, 51 is transmitted to the control device 40.

The two left and right caster wheels 15, 16, which are supported on the front end of the main frame 20, are steering wheels as well as front wheels. Each of the caster wheels 15, 16 is spaced apart from the left wheel 12 and the right wheel 13 in the front-rear direction of the vehicle 10. Each of the caster wheels 15, 16 is freely rotatable by 360 degrees or more around a vertical axis (the up-down direction in FIG. 1). The caster wheel is not limited to the configuration in which two caster wheels are located on the vehicle, but only one or three or more caster wheels may be located on the vehicle.

As shown in FIG. 2, the left traveling motor 30 is connected to the left wheel 12 via a left reduction gear device 58 supported on the rear side of the main frame 20. The right traveling motor 31 is connected to the right wheel 13 via a right reduction gear device 59 supported on the rear side of the main frame 20. The left traveling motor 30 and the right traveling motor 31 are supported at the rear and on the left and right sides of the main frame 20, respectively.

The left traveling motor 30 is connected to a battery 82 (see FIG. 3) via the left traveling inverter 84 (see FIG. 3), so that power is supplied from the battery 82. The right traveling motor 31 is connected to the battery 82 (see FIG. 3) via the right traveling inverter 86 (see FIG. 3), so that power is supplied from the battery 82. Each of the left traveling motor 30 and the right traveling motor 31 may be a three-phase motor, for example.

As shown in FIGS. 1 and 2, the mowing device 18 is supported under the main frame 20 in a longitudinal mid-section thereof. This causes the mowing device 18 to be positioned between the caster wheels 15, 16 and the left and right wheels 12, 13 in the front-rear direction. The mowing device 18 includes three mowing blades 18a, 18b, and 18c (se FIG. 2) which are rotary lawn mowing tools located inside a mower deck 19 being a cover. The tops of the mowing blades 18a, 18b, and 18c are covered by the mower deck 19. Each of the mowing blade 18a, 18b, and 18c has a plurality of blade elements which rotate around an axis oriented in the vertical direction (front-rear direction of the paper of FIG. 2). This allows the blade elements to rotate to break up lawn grass, thereby performing lawn mowing. Each of the three mowing blades 18a, 18b, and 18c is connected to a corresponding deck motor 60 of three deck motors 60 which are working motors. Each of the deck motors 60 is connected to the battery 82 (see FIG. 3) via the deck inverter 88 (see FIG. 3) which is an inverter for the corresponding deck motor 60, so that power is supplied from the battery 82. Each of the deck motors 60 may be the three-phase motor, for example. In addition, each of the deck motors 60 is equipped with the motor temperature sensor 34 (see FIG. 3) described later. The motor temperature sensor 34 detects the temperature of the corresponding deck motor 60. The detected temperature is used to set a target torque range for the deck motor 60, as described later.

The mowing device may be configured to include a lawn mowing reel as a rotary lawn mowing tool, which has a spiral blade, for example, arranged on a rotation axis parallel to the ground surface, functions to pinch and mow the lawn, etc., and is driven by the deck motor.

Figure 3:
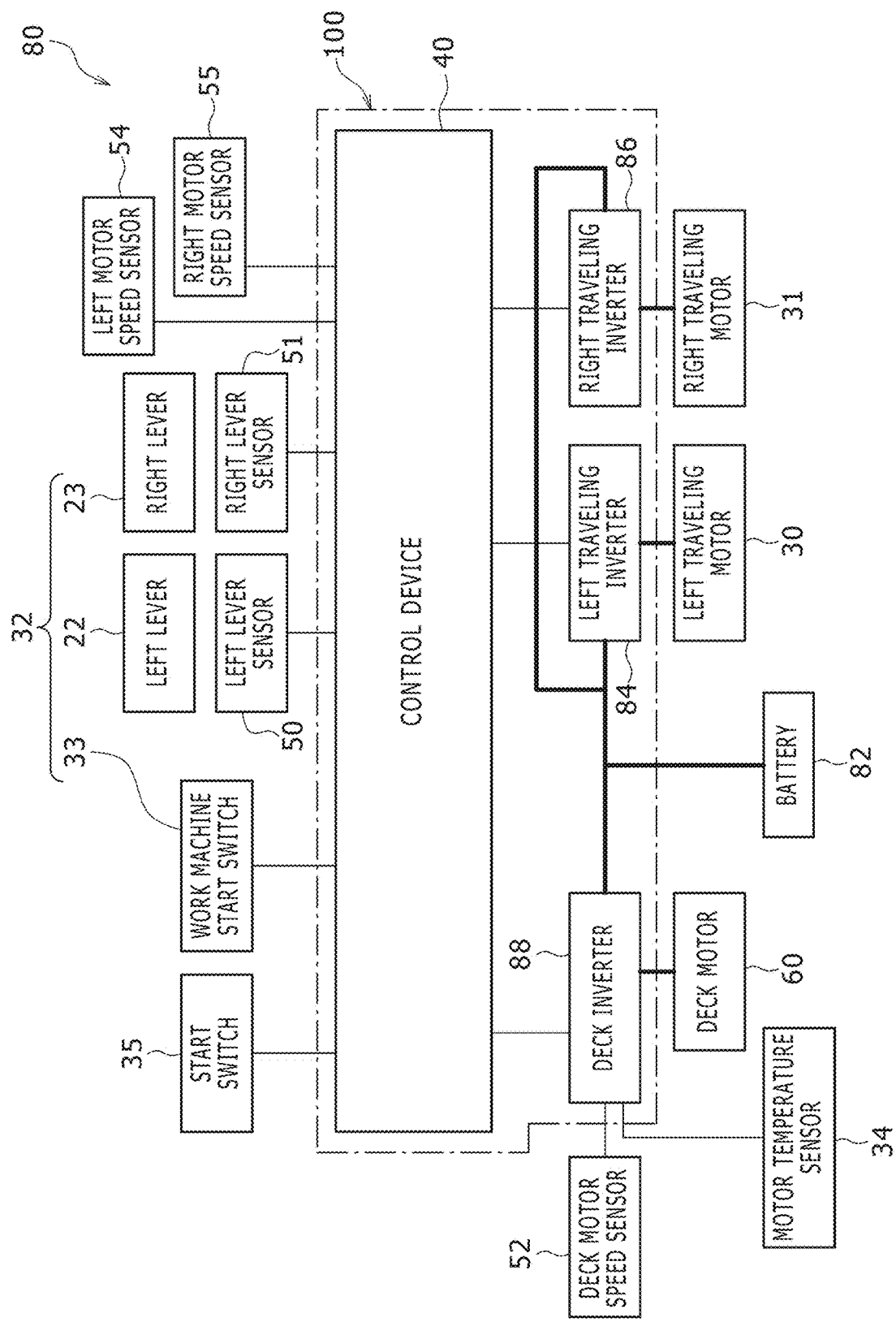
FIG. 3 is a block diagram of a control system for a vehicle shown in FIG. 1.

FIG. 3 is a block diagram illustrating a control system 80 for the vehicle 10. The control device 40 is connected with a start switch 35, the work machine start switch 33, the left and right lever sensors 50, 51, the left and right traveling inverters 84, 86, the deck inverter 88, and two motor speed sensors 54, 55. The start switch 35 and the work machine start switch are provided on either guide panel 26 (or 27) which guides one of the two left and right operation levers 22, 23, or in the vicinity thereof. The start switch 35 is provided to be operated by the user, and power is supplied from the battery 82 to the control device 40 based on the operation of the start switch to activate the control device 40. The work machine start switch 33 is provided to be operated by the user, and a state of the mowing device 18 is switched between active and non-active based on the operation of the work machine start switch. When the start of the mowing device 18 is directed; that is, when the mowing device is turned on by the work machine start switch 33, the control device 40 controls the deck inverters 88 described later to operate the deck motors 60 so that the deck motors 60 continue to rotate at a predetermined target number of rotations.

The control system 80 includes the start switch 35, the manipulator 32 including the work machine start switch 33 and two left and right operation levers 22, 23, the left and right lever sensors 50, 51, the left and right traveling motors 30, 31 and traveling inverters 84, 86, the left and right motor speed sensors 54, 55, the three deck motors 60 and deck inverters 88, three deck motor speed sensors 52 and motor temperature sensors 34, and the control device 40. In FIG. 3, the deck motor 60, the deck inverter 88, the deck motor speed sensor 52, and motor temperature sensor 34 are each illustrated as a single, but, as illustratively shown in FIG. 2, three deck motors 60 are provided, so that in the control system 80, the deck inverter 88, the deck motor speed sensor 52, and the motor temperature sensor 34 are provided in the number of three, one each for every deck motor, accordingly.

The left traveling inverter 84 drives the left traveling motor 30, and the right traveling inverter 86 drives the right traveling motor 31. Each of the traveling inverters 84, 86 includes a traveling inverter circuit which includes three arms each having two switching elements electrically connected in series, for example, and a traveling inverter control device to control the traveling inverter circuit.

The operation of each of the traveling inverters 84, 86 is controlled by the control device 40. This allows the left traveling motor 30 to be controlled by the control device 40 via the left traveling inverter 84. The right traveling motor 31 can be controlled by the control device 40 via the right traveling inverter 86. Therefore, the left traveling motor 30 and the right traveling motor 31 are independently controlled by the control device 40 for direction and speed of rotation. Thereby, the left traveling motor 30 and the right traveling motor 31 can independently drive the left wheel 12 and the right wheel 13 for direction and speed of rotation.

Each of the deck inverters 88 drives the corresponding deck motor 60. Similar to the traveling inverter circuit and the traveling inverter control device of each of the traveling inverters 84, 86, each of the deck inverters 88 also has a deck inverter circuit and a deck inverter control device to control the deck inverter circuit.

The operation of each of the deck inverters 88 is controlled by the control device 40. This allows each of the deck motors 60 to be controlled by the control device 40 via the deck inverter 88. Therefore, each of the mowing blades 18a, 18b, and 18c is driven rotationally by the corresponding deck motor 60. Basically, each of the deck motors 60 is driven to maintain a predetermined target number of rotations. The lawn grasses cut by the mowing device 18 are discharged outside of the vehicle 10 to one side in the left-right direction through a discharge duct 18d provided on one side of the mower deck 19 in the left-right direction.

In addition, the deck inverter control device of each of the deck inverters 88 receives a detected value of the number of rotation n ($sec^{-1}$) of the deck motor 60 from the deck motor speed sensor 52 described later. Furthermore, the deck inverter control device receives a detected value from a current sensor (not shown) to detect current output from the deck inverter circuit to the deck motor 60, and a detected value from a voltage sensor (not shown) to detect an inter-phase voltage of the deck motor 60. The deck inverter control device calculates the output power P (W) to be output to the deck motor 60 from the detected current and voltage values. The deck inverter control device may calculate the voltage value of the deck motor 60 from the detected current value and the rotation number value detected by means of the deck motor speed sensor 52 and calculate the output power P based on them. The detected value of the number of rotations n of the deck motor 60 and the calculated value of the output power P to the deck motor 60 are output from each of the deck inverters 88 to the control device 40 and are used to calculate a calculated output torque value Tr of the deck motor 60 as described later.

In addition, each of the deck motors 60 is equipped with the motor temperature sensor 34. Each of the motor temperature sensors 34 detects the temperature of the corresponding deck motor 60. The detected temperature of each motor temperature sensor 34 is output to the control device 40 via signal lines and the corresponding deck inverter 88. For example, each of the motor temperature sensors 34 directly detects the temperature of a portion which is most likely to be getting a high temperature among each of the deck motors 60, or detects the temperature based on estimation of the detected temperature of another portion closely correlated with the temperature of that portion.

Furthermore, the two lent and right motor speed sensors 54, 55 detect rotation numbers of the two left and right traveling motors 30, 31, respectively. The detected rotation number of each of the motor speed sensor 54, 55 is output to the control device 40. Each of the deck motor speed sensors 52 detects the number of rotations of the corresponding deck motor 60. The detected rotation number value of the deck motor speed sensor 52 is output to the control device 40 via the corresponding deck inverter 88. In FIG. 3, thick solid lines draw power supply paths from the battery 83.

The control device 40 includes an arithmetic unit such as a CPU and a storage unit such as a memory, and may be composed of a microcomputer, for example. The control device 40 obtains operating positions of the two operation levers 22, 23 from signals detected by the left and right two lever sensors 50, 51, and sets target number of rotations of the left traveling motor 30 and the right traveling motor 31 according to the operating positions of the operation levers 22, 23, respectively.

By setting the target number of rotations of the left and right traveling motors 30, 31 according to the operating positions of the left and right operation levers 22, 23, the control device 40 enables the vehicle to perform straight traveling or turning traveling.

Furthermore, in the case where the work machine start switch 33 is turned on and the target rotation speed, which is higher than the predetermined rotation speed for each of the traveling motors 30, 31, is directed by the left and right operation levers 22, 23, the control device 40 maintains or changes a target torque range of the corresponding deck motor 60 according to the detected temperatures of the respective deck motors 60 or the detected temperature of the predetermined one deck motor 60 (hereinafter referred to as the predetermined deck motor 60). Then, the control device 40 maintains or changes the target rotation speed of each of the traveling motors 30, 31 so that the calculated output torque value Tr of each of the deck motors 60 or the predetermined deck motor 60 falls within a target torque range. This makes it possible to achieve both protection of each of the deck motors 60 and an improvement of work efficiency by maintaining a high vehicle speed, as described later. In order to maintain or change the target rotation speed of each of the traveling motors 30, 31, it can be set in advance by the control device 40 whether to use the detected temperatures of the respective deck motors 60 or to use the detected temperature of the predetermined deck motor 60. Generally, since it is considered that three deck motors 60 are subjected to similar load and almost the same temperature change, the target rotation speed of the traveling motors 30, 31 may be controlled by using only the predetermined deck motor 60. In this case, the motor temperature sensors for the other deck motors 60 may be omitted. The predetermined deck motor may be a central deck motor 60 among the three deck motors 60, for example. The following mainly describes the case where the target rotation speed of the traveling motors 30, 31 is controlled by using only the detected temperature of the predetermined deck motor 60.

Figure 4:
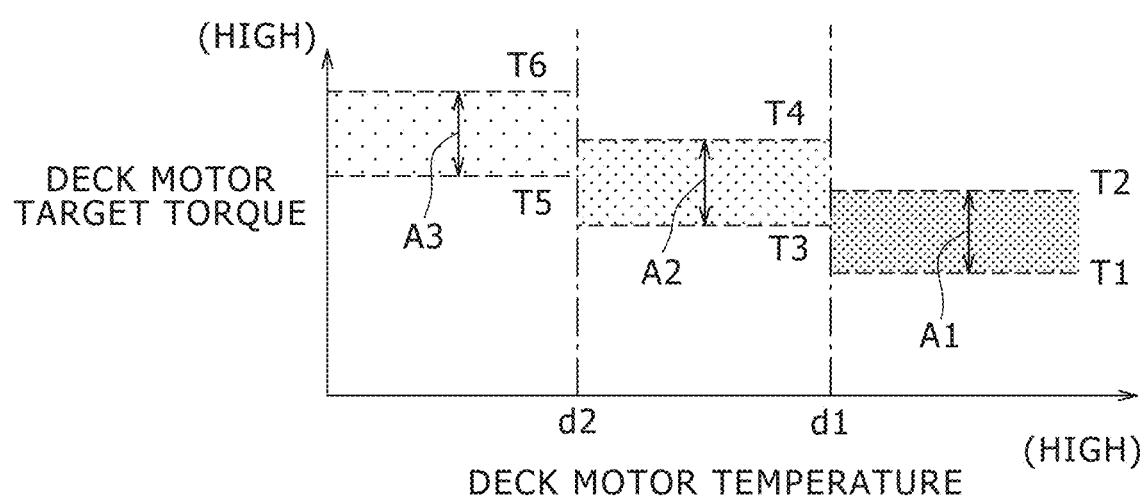
FIG. 4 is a diagram showing the relationship between the temperature of a deck motor of being a working motor and a target torque range in the embodiment.

FIG. 4 shows a relationship between the temperature of the deck motor 60 and the target torque range in the embodiment. The target torque range of the deck motor 60 is set according to the temperature of the deck motor 60. In the example in FIG. 4, when the temperature of the deck motor 60 is not less than a predetermined first temperature d1, the target torque range of the deck motor 60 becomes a predetermined first range A1. The first range A1 corresponds to a low torque range in which a lower limit is illustrated as torque T1, and an upper limit is illustrated as torque T2. On the other hand, when the temperature of the deck motor 60 is less than the predetermined first temperature d1 and higher than a predetermined second temperature d2 which is lower than the first temperature d1, the target torque range of the deck motor 60 becomes a predetermined second range A2. The second range A2 corresponds to an intermediate torque range in which the lower limit is illustrated as torque T3 between torque T1 and torque T2, and the upper limit is illustrated as torque T4 which is higher than torque T2. Furthermore, when the temperature of the deck motor 60 is not more than the second temperature d2, the target torque range of the deck motor 60 becomes a predetermined third range A3. The third range A3 corresponds to a high torque range in which the lower limit is illustrated as torque T5 between torque T3 and torque T4, and the upper limit is illustrated as torque T6 which is higher than torque T4.

The control device 40 sets the target torque range of the deck motor 60 using the relationship shown in FIG. 4 so that when the detected temperature of the deck motor 60 is not less than the first temperature d1, the deck motor 60 is driven at the target torque in the first range A1, and when the detected temperature of the deck motor 60 is not more than the second temperature d2, the deck motor 60 is driven at the target torque in the third range A3, which is higher in torque than the first range A1.

Then, the control device 40 maintains or changes the target rotation speed of each of the traveling motors 30, 31 so that the calculated output torque value Tr of the deck motor 60 falls within the target torque range mentioned above. Here, the calculated output torque value Tr (N–m) of the deck motor 60 can be operated using the following equation (1) based on the calculated value of the output power P (W) output to the deck motor 60, which is obtained in the corresponding deck inverter as described above, and the detected value of the number of rotation n ($sec^{-1}$) of the deck motor 60.

$$Tr = P/(2\pi \times n)$$ Equation (1)

The deck motor speed sensor 52 may detect an angular velocity ω (rad/sec) of the deck motor 60 in place of the number of rotations of the deck motor 60. In this case, the calculated output torque value Tr (N–m) of the deck motor 60 can be operated using the following equation (2).

$$Tr = P/\omega$$ Equation (2)

When the calculated value Tr is lower than the lower limit of the target torque range, the target rotation speed of each of the traveling motors 30,31 is increased linearly with respect to time, increased by a predetermined amount per a predetermined time, or increased by a predetermined percentage per a predetermined time. On the other hand, when the calculated value Tr is higher than the higher limit of the target torque range, the target rotation speed of each of the traveling motors 30,31 is decreased linearly with respect to time, decreased by a predetermined amount per a predetermined time, or decreased by a predetermined percentage per a predetermined time. This causes the speed of the vehicle to be automatically adjusted so that the temperature of the deck motor 60 becomes not too high and a traveling time at a higher speed becomes longer.

FIG. 5 is a flowchart showing a method of controlling the target rotation speed of the traveling motors 30, 31. In step S10 of FIG. 5, the control device 40 determines whether or not the work machine start switch 33 is turned on and the target rotation speed of each of the traveling motors 30, 31, which is not less than the predetermined rotation speed, is directed by the left and right operation levers 22, 23. If the determination result in step S10 is positive (YES), in step S12, the control device 40 calculates the output torque of the corresponding deck motor 60, and causes the deck inverter 88 and the motor temperature sensor 34 to detect the temperature of the deck motor 60.

After the processing in step S12, in step S14, the target torque range of the deck motor 60 is maintained or changed according to the detected temperature of the corresponding deck motor 60. Namely, the target torque range for the deck motor 60 is set using the relationship shown in FIG. 4 mentioned above.

Then, in step S16, the control device 40 maintains or changes the target rotation speed of each of the traveling motors 30, 31 so that the calculated output torque value Tr of the deck motor 60 falls within the target torque range.

On the other hand, if the determination result in step S10 is negative (NO), a normal control, in which no traveling control of the traveling motors 30, 31 using the detected temperature of the deck motor 60 is done, is performed and the process is terminated.

According to the vehicle 10 mentioned above, when the detected temperature of the deck motor 60 becomes higher, the target torque range for the deck motor 60 can be changed to a lower torque range accordingly, so that the deck motor 60 can be protected. Being different from the case where to force the vehicle to travel at an exceptional speed lower than the normal speed whenever the detected temperature mentioned above is high, there is a case where it is possible to increase the traveling speed when the load on the deck motor 60 is low, thereby allowing for a longer traveling time at the higher speed. In addition, since the target torque range is changed by the detected temperature of the deck motor 60, it is possible to protect the deck motor 60 more appropriately than in the case where the target torque range is changed according to the load thereon. This can prevent the target rotation speed of the traveling motors 30, 31 from decreasing excessively, so that it is possible to achieve both protection of the deck motor 60 and improvement of work efficiency by allowing for a longer traveling time at a higher speed.

Furthermore, the controller 100 sets the target torque range for the deck motor 60 so that when the detected temperature of the deck motor 60 is not less than the first temperature d1, the deck motor 60 is driven in the first range A1 being a low torque range, and when the detected temperature of the deck motor 60 is not more than the second temperature d2 lower than the first temperature d1, the deck motor 60 is driven in the third range A3 being a high torque range. This allows for higher work efficiency while protecting the deck motor 60.

The example of FIG. 4 describes the case where the target torque range switches among three ranges A1 to A3 according to the temperature of the deck motor 60, but the target torque range may switch between only two ranges or may switch among four or more ranges.

Furthermore, it may be configured to perform the speed control of each of the traveling motors 30, 31 using the detected temperatures of the respective three deck motors 60. In such a case, the controller may maintain or change the target rotation speed of each of the traveling motors 30, 31 so that the calculated output torque value of the corresponding deck motor 60 falls within the target torque range according to the detected temperature of each of the deck motors 60. In this case, if the target rotation speed of each of the traveling motors 30, 31, which is to ensure that the calculated output torque value of the corresponding deck motor 60 falls within the target torque range according to the detected temperature of each of the deck motors 60, is not uniquely determined, it may be configured to maintain the previous target rotation speed.

In addition, when controlling the rotation speed of each of the traveling motors 30, 31 using the detected temperatures of the respective deck motors 60, the same target torque range is set for the respective deck motors 60 using maximum or average temperature among the detected temperatures of three deck motors 60, and the target speed of each of the traveling motors 30, 31 may be set accordingly.

Also, in step S10 of FIG. 5, the predetermined rotation speed in determining by the control device 40 whether the indication of the target rotation speed of each of the traveling motors 30, 31 is not less than the predetermined rotation speed may be set to the rotation speed of each of the traveling motors 30, 31 at the time when the torque of the deck motor 60 achieves a value not less than the torque T5 at the lower limit of the highest torque range (third range A3 illustrated in FIG. 4) when a predetermined amount of lawn grasses are mowed by the mowing device 18. This can prevent the rotation speed of each of the traveling motors 30, 31 from automatically increasing beyond the target rotation speed of each of the traveling motors 30, 31 that the user directs using the manipulator 32, and suppress the traveling speed of the vehicle from increasing automatically, thereby suppressing the user's discomfort. In step S10 of the flowchart in FIG. 5, whether or not a target rotation speed not less than the predetermined rotation speed of each of the traveling motors 30, 31 is directed may be excluded from the condition for moving to step S12.

Figure 6:
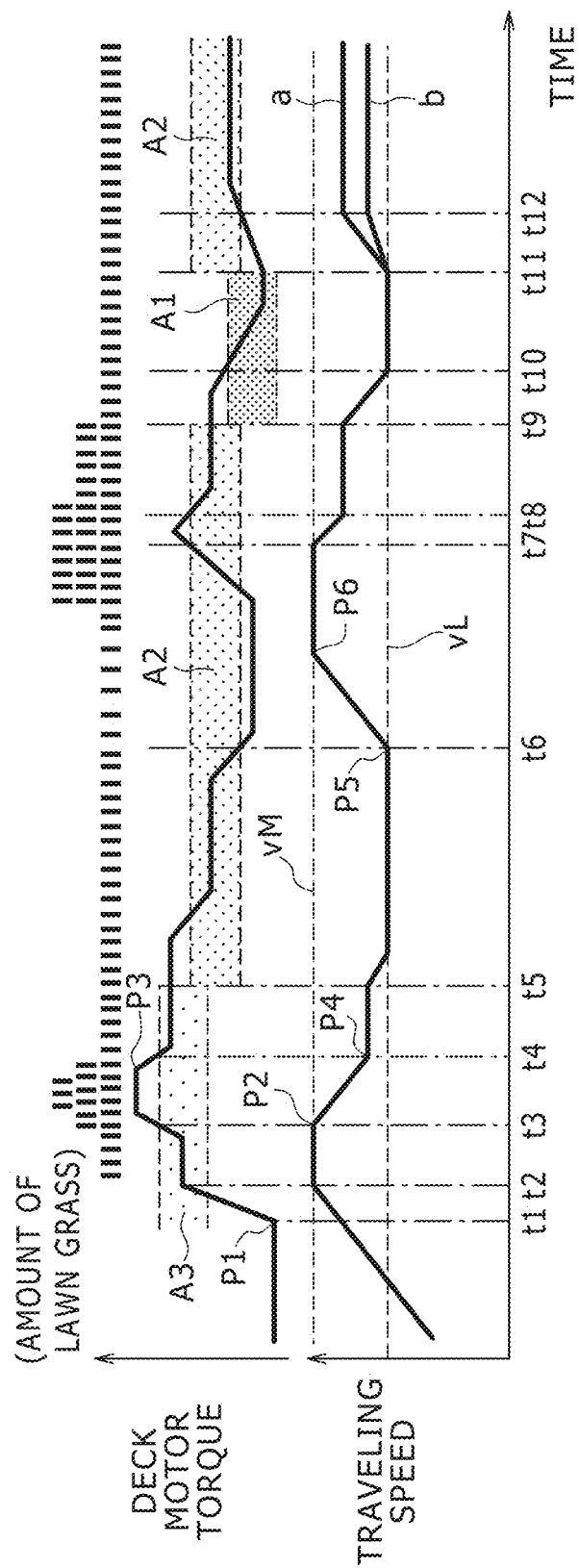
FIG. 6 is a diagram showing an example of the relationship between time and the torque of the deck motor and a traveling speed of the vehicle in the embodiment.

FIG. 6 is a diagram showing an example of the relationship between time and the torque of the deck motor 60 and a traveling speed of the vehicle 10 in the present embodiment. In FIG. 6, the x axis represents time, and the y axis represents the torque of the deck motor 60 and the traveling speed of the vehicle 10. A thick solid line a in FIG. 6 shows the traveling speed in the present example. The amount of lawn grasses to be mowed by the mowing device 18 is shown in the upper part of the drawing, indicating that the greater the number of vertical lines, the greater the amount of lawn grasses at that time.

FIG. 6 shows an example that the target rotation speed of each of the traveling motors 30, 31, which is directed by manipulator 32, is a constant speed not less than the predetermined speed, and the vehicle moves straight forward. First, the speed of the vehicle 10 increases in a linear manner, mowing of the lawn begins at time t1 on its way, and the torque of the deck motor 60 starts to increase from P1 accompanied by the increase of the traveling speed. In this case, the target torque range is set to the third range A3, since the temperature of the deck motor 60 is low. Then, at time t2, it is determined that the torque of the deck motor 60 is within the third range, and the traveling speed and the torque of the deck motor 60 are maintained constant as the traveling speed reaches the predetermined upper limit speed vM. However, at time t3, the target rotation speed of each of the traveling motors 30, 31 decreases and the traveling speed decreases from P2 as the amount of lawn grasses increases and the torque of the deck motor 60 rises to exceed the upper limit of the third range A3. This decrease in the traveling speed causes a reduction in the amount of lawn grasses to be mowed by the mowing device 18, so that the load on the deck motor 60 is reduced and its torque is decreased from P3.

Then, at time t4, as the torque of the deck motor 60 returns to the third range A3, the traveling speed is maintained constant from P4 at a lower speed. Then, as the temperature of the deck motor 60 rises, at time t5, the target torque range of the deck motor 60 is changed to the second range A2. This causes the target rotation speed of each of the traveling motors 30, 31 to be reduced, thereby reducing the traveling speed as well. This traveling speed is decreased to the lower limit speed vL during work and maintained constant. Then, the load on the deck motor 60 becomes lower as the amount of lawn grasses becomes smaller, and upon the torque of the deck motor 60 falling below the lower limit of the target torque range at time t6, the target rotation speed of each of the traveling motors 30, 31 increases and the traveling speed rises from P5. This traveling speed is maintained constant when it reaches the upper limit speed vM at P6.

Then, the torque of the deck motor 60 rises as the load increases due to the increase in the amount of lawn grasses again. At time between t7 and t8, as the torque of the deck motor 60 exceeds the upper limit of the second range A2 and the target rotation speed of each of the traveling motors 30, 31 decreases, the torque of the deck motor 60 returns to the second range A2. Then, as the temperature of the deck motor 60 further rises at time t9, the target torque range of the deck motor 60 is changed to the first range A1. This causes the target speed of each of the traveling motors 30, 31 to be reduced to the lower limit speed vL and to be maintained constant, while the target torque range is changed to the second range A2 as the temperature of the deck motor 60 drops, thereby increasing the target rotation speed of each of the traveling motors 30, 31 so that the torque of the deck motor 60 falls within the second range A2. This causes the traveling speed to increase.

In the example shown in FIG. 6, since the configuration in the present example allows the torque of the deck motor 60 to be controlled so as to fall within the appropriate target torque range according to the temperature of the deck motor 60, it is possible to achieve both protection of the deck motor 60 and improvement of work efficiency by allowing for a longer traveling time at high vehicle speed.

In FIG. 6, a thin solid line b branching off from the thick solid line a which shows the traveling speed in the present example shows an alternative example of the embodiment. Before time t10, the configuration of the alternative example is the same as that of the embodiment shown by the thick solid line a. In the configuration of the alternative example, at time between t8 to t10, as the detected temperature of the deck motor 60 is not less than the predetermined first temperature d1, the target torque range of the deck motor 60 is set to the first range A1, and after time t10, as the detected temperature of the deck motor 60 is not more than the predetermined second temperature d2 which is lower than the first temperature d1, the target torque range of the deck motor 60 is set to the second range A2. In this case, the first range A1 and the second range A2 correspond to the low torque range and the high torque range, respectively. Then, after the controller 100, at time between t9 and t10, performs a vehicle traveling speed decreasing control in which the detected temperature of the deck motor 60 is not less than the first temperature d1 and the deck motor 60 is driven in the first range A1, the controller 100, after time t10, performs a vehicle traveling speed increasing control in which the detected temperature of the deck motor 60 is not more than the temperature (the second temperature) lower than the first temperature d1 and the deck motor 60 is driven in the second range A2. The controller 100 further performs a control such that an absolute value of the acceleration of the vehicle 10 at this time is smaller than an absolute value of the deceleration of the vehicle 10 when performing the vehicle traveling speed decreasing control.

The configuration of the alternative example mentioned above can prevent the vehicle 10 from sudden acceleration in the high traveling speed state, thereby suppressing the jerkiness of the traveling speed of the vehicle.

Figure 7:
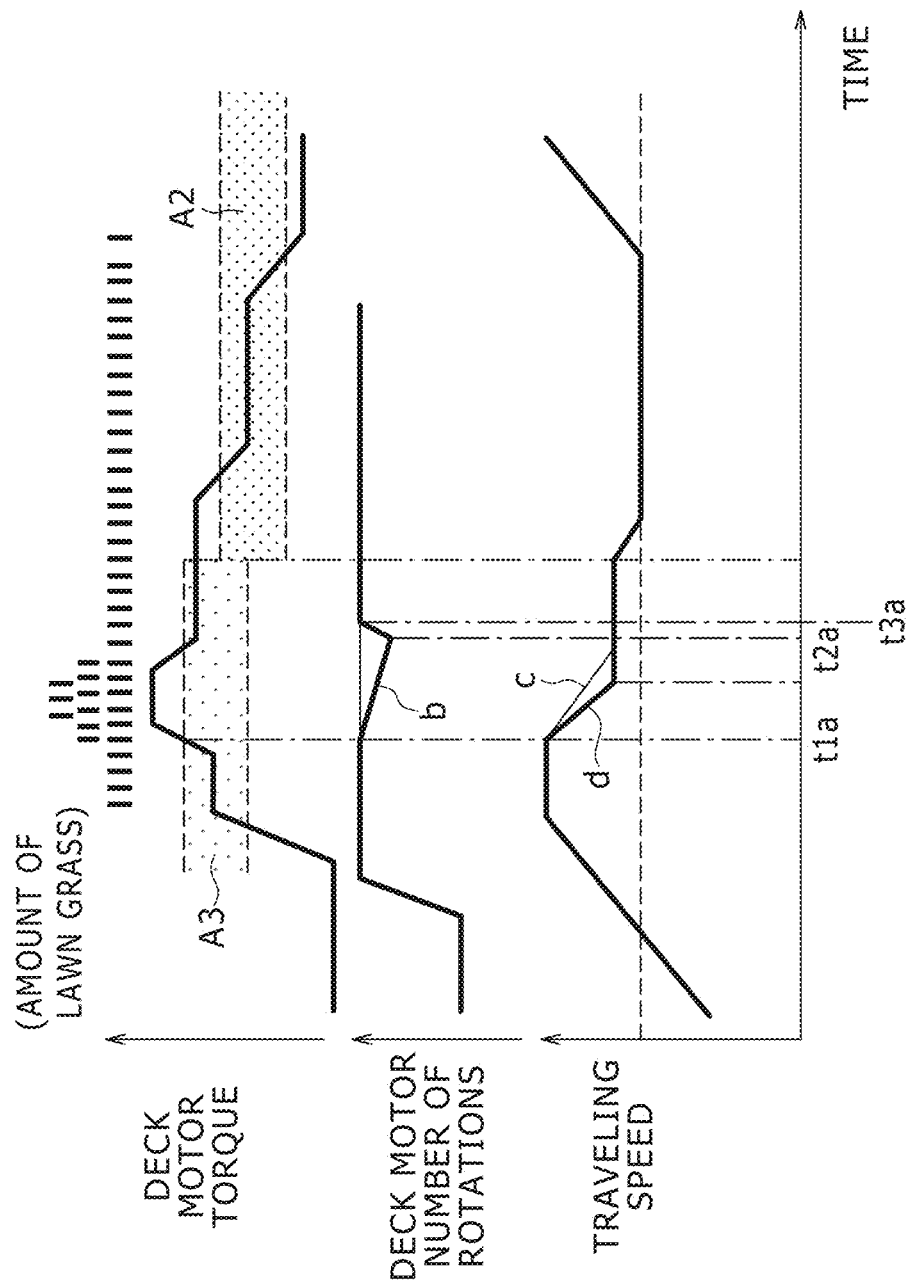
FIG. 7 is a diagram showing an example of the relationship between time and the torque of the deck motor, the number of rotations of the deck motor, and a traveling speed of the vehicle in another embodiment.

FIG. 7 shows another example of the relationship between time and the torque of the deck motor 60, the number of rotations of the deck motor 60, and the traveling speed of the vehicle 10 in another embodiment. In FIG. 7, the thick solid lines indicate the number of rotations of the deck motor and the traveling speed in the configuration according to the present embodiment. Basically, the number of rotations of the deck motor 60 is controlled so that during operation it increases to the target number of rotations and then maintains the target number of rotations. However, if the deck motor 60 becomes overloaded due to a larger amount of lawn grasses to be mowed, poor discharge of mowed lawn grasses from the mower deck 19, accumulation of mowed lawn grasses in the mower deck 19, etc., the number of rotations of the deck motor 60 may be reduced from time t1a as shown at b. In this example, in the case where a reduction amount of the detected rotation number of the deck motor 60 per a predetermined time period is not less than the predetermined reduction amount, the controller 100 controls a decrease rate of the traveling speed of the vehicle to increase it to the decrease rate which is greater than the decrease rate indicated by c in the configuration shown FIGS. 1 to 6 according to the reduction amount. For this purpose, the control device 40 controls the number of rotations of each of the traveling motors 30, 31 so as to increase the decrease rate of the traveling speed of the vehicle using the two left and right motor speed sensors 54, 55 (see FIG. 3). This allows the load on the deck motor 60 to be reduced, since the decrease rate of the traveling speed of the vehicle 10 increases, as shown by d in FIG. 7. Therefore, it is possible to improve the durability and mowing accuracy of the deck motor 60. In addition, since the load on the deck motor 60 is reduced by the decrease in traveling speed, this makes it easier for the deck motor 60 to return its number of rotations to the predetermined target number of rotations at time between t2a and t3a. The other configurations and actions of this example are the same as those of the embodiment shown in FIGS. 1 through 6.

Figure 8:
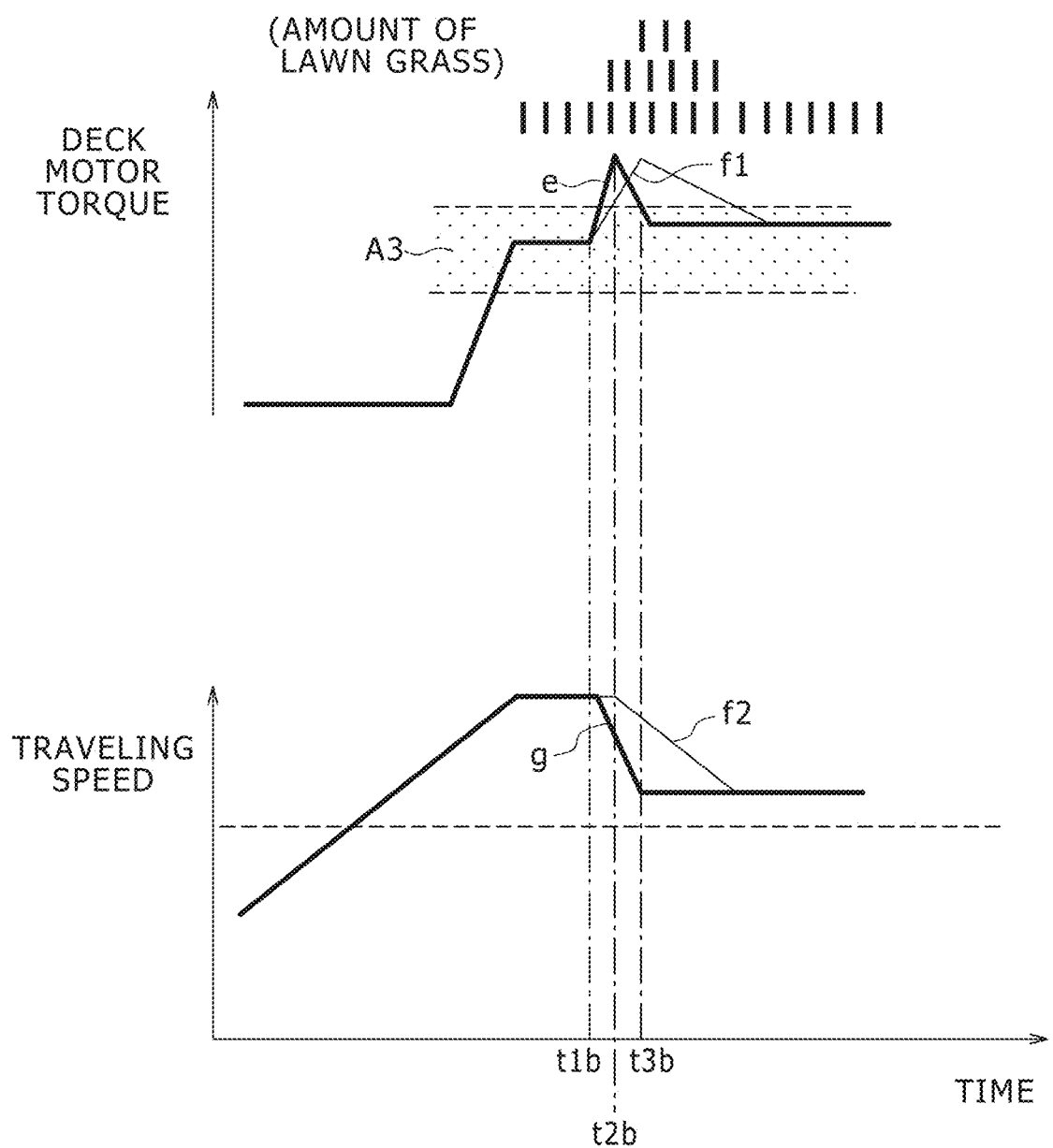
FIG. 8 is a diagram showing an example of the relationship between time and the torque of the deck motor and the traveling speed of the vehicle in another embodiment.

FIG. 8 shows an example of the relationship between time and the torque of the deck motor 60 and the traveling speed of the vehicle 10 in another embodiment. In FIG. 8, the thick solid lines indicate the deck motor torque and the traveling speed according to the present embodiment. A sudden increase in the load on the deck motor 60 due to poor discharge of lawn grasses mowed during lawn mowing operation and the like may result in a large change rate of increase in the motor torque with respect to time. In this case, a prolonged overload condition of the deck motor 60 may lead to deterioration of the durability and mowing accuracy of the deck motor 60. In the configuration of this example, in the case where a change rate of increase in the calculated output torque value of the deck motor 60 is not less than the predetermined change rate, the controller 100 controls a decrease rate of the traveling speed of the vehicle to increase according to the change rate of increase. Specifically, in the example shown in FIG. 8, at time between t1b and t2b, in the case where the change rate of increase in the calculated output torque value of the deck motor 60 is higher than the change rate of increase in the configuration indicated by a fine solid line f1 as shown by e, the controller 100 controls the decrease rate of the traveling speed of the vehicle to increase it to the decrease rate indicated by g, which is greater than the decrease rate indicated by the fine solid line f2 corresponding to the fine solid line f1.

The configuration of the present example causes the decrease rate of the traveling speed of the vehicle to increase when the change rate of increase in output torque is higher due to the sudden increase in the load on the deck motor 60 as mentioned above. This allows a reduction in the load on the deck motor 60. Therefore, it is possible to improve the durability and mowing accuracy of the deck motor 60. In addition, since deceleration of the traveling speed starts when the output torque of the deck motor 60 exceeds the upper limit of the third range A3, a start time of deceleration indicated by g can be earlier than a start time t2*b* of deceleration indicated by f2. This allows the load on the deck motor 60 to be reduced earlier, so that the output torque of the deck motor 60 can be rapidly reduced at time between t2*b* and t3*b*. The other configurations and actions of this example are the same as those of the embodiment described with reference to FIGS. 1 through 6, or FIG. 7.

At least one embodiment mentioned above has the configuration of the electric work vehicle according to the present disclosure. In this way, when the detected temperature of the working motor increases, the target torque range of the working motor can be changed to a lower range, accordingly, thereby protecting the working motor. In addition, being different from the case where to force the vehicle to travel at an exceptional speed lower than the normal speed whenever the detected temperature mentioned above is high, there is a case where it is possible to increase the traveling speed when the load on the work machine is low, thereby allowing for a longer traveling time at the higher speed. Furthermore, since the target torque range is changed by the detected temperature of the working motor, it is possible to protect the working motor more appropriately than in the case where the target torque range is changed according to the load thereon. This can prevent the target rotation speed of the traveling motor from decreasing excessively, so that it is possible to achieve both protection of the working motor and improvement of work efficiency by allowing for a longer traveling time at a higher speed.

The electric work vehicle according to the present disclosure may be the second configuration in which the controller sets the target torque range of the working motor so that the working motor is driven in a low torque range when the detected temperature of the working motor is not less than a predetermined first temperature, and the working motor is driven in a high torque range when the detected temperature of the working motor is not more than a predetermined second temperature that is lower than the first temperature. According to the second configuration mentioned above, it is possible to achieve higher work efficiency while protecting the working motor.

The second configuration mentioned above may be further configured such that after the controller performs a vehicle traveling speed decreasing control in which the detected temperature of the working motor is not less than the first temperature and the working motor is driven in the low torque range, the controller performs a vehicle traveling speed increasing control in which the detected temperature of the working motor is not more than the second temperature and the working motor is driven in the high torque range, and the controller performs a control such that an absolute value of a vehicle acceleration when performing the vehicle traveling speed increasing control is smaller than an absolute value of the vehicle deceleration when performing the vehicle traveling speed decreasing control. According to the configuration mentioned above, it is possible to prevent sudden acceleration of the vehicle, thereby suppressing the jerkiness of the traveling speed of the vehicle.

The second configuration mentioned above may be further configured such that when an amount of decrease per a predetermined time of a detected value of a rotation speed of the working motor is not less than a predetermined amount of decrease, the controller increases a decrease rate of a vehicle traveling speed according to the amount of decrease. According to the configuration mentioned above, the load on the working motor can be reduced by increasing the decrease rate of the traveling speed when the reduction amount of the rotation speed of the working motor is higher due to poor discharge of mowed lawn grasses, etc. Thereby, it is possible to improve the durability of the working motor and the work accuracy such as mowing accuracy.

The second configuration mentioned above may be further configured such that when a change rate of increase of the calculated output torque value of the working motor is not less than a predetermined change rate, the controller increases a decrease rate of a vehicle traveling speed according to the change rate. According to the configuration mentioned above, the load on the working motor can be reduced by increasing the decrease rate of the traveling speed of the vehicle when the load on the working motor increases rapidly and the change rate of increase in the output torque of the working motor is higher due to poor discharge of mowed lawn grasses, etc. Thereby, it is possible to improve the durability of the working motor and the work accuracy such as mowing accuracy.

What is claimed is:

1. An electric work vehicle comprising:
   a traveling motor to drive wheels;
   a working motor to drive a work machine;
   a manipulator to direct a target rotation speed of the traveling motor and operation of the work machine;
   a controller to control the traveling motor and the working motor according to operation of the manipulator; and
   a temperature sensor to detect temperature of the working motor,
   wherein the controller is configured to maintains or changes a target torque range of the working motor according to a detected temperature of the working motor, and
   the controller is configured to maintain a target rotation speed of the traveling motor in a state that calculated output torque value of the working motor falls within the target torque range and configured to change the target rotation speed of the traveling motor in a state that the calculated output torque value of the working motor falls outside the target torque range so that the calculated output torque value of the working motor falls within the target torque range.

2. The electric work vehicle according to claim 1, wherein the controller is configured to set the target torque range of the working motor so that the working motor is driven in a low torque range when the detected temperature of the working motor is not less than a predetermined first temperature, and so that the working motor is driven in a high torque range when the detected temperature of the working motor is not more than a predetermined second temperature that is lower than the first temperature.

3. The electric work vehicle according to claim 2, wherein when, after the controller performs a vehicle traveling speed decreasing control in which the detected temperature of the working motor is not less than the first temperature and the working motor is driven in the low torque range, the controller performs a vehicle traveling speed increasing control in which the detected temperature of the working motor is not more than the second temperature and the working motor is driven in the high torque range, the controller performs a control so that an absolute value of a vehicle acceleration when performing the vehicle traveling speed increasing control is smaller than an absolute value of a vehicle deceleration when performing the vehicle traveling speed decreasing control.

4. The electric work vehicle according to claim 2, wherein when an amount of decrease per a predetermined time of a detected value of a rotation speed of the working motor is not less than a predetermined amount of decrease, the controller increases a decrease rate of a vehicle traveling speed according to the amount of decrease of the detected value.

5. The electric work vehicle according to claim 2, wherein when a change rate of increase of the calculated output torque value of the working motor is not less than a predetermined change rate, the controller increases a decrease rate of a vehicle traveling speed according to the change rate of the increase of the calculated output torque value.

* * * * *